United States Patent Office 3,310,620
Patented Mar. 21, 1967

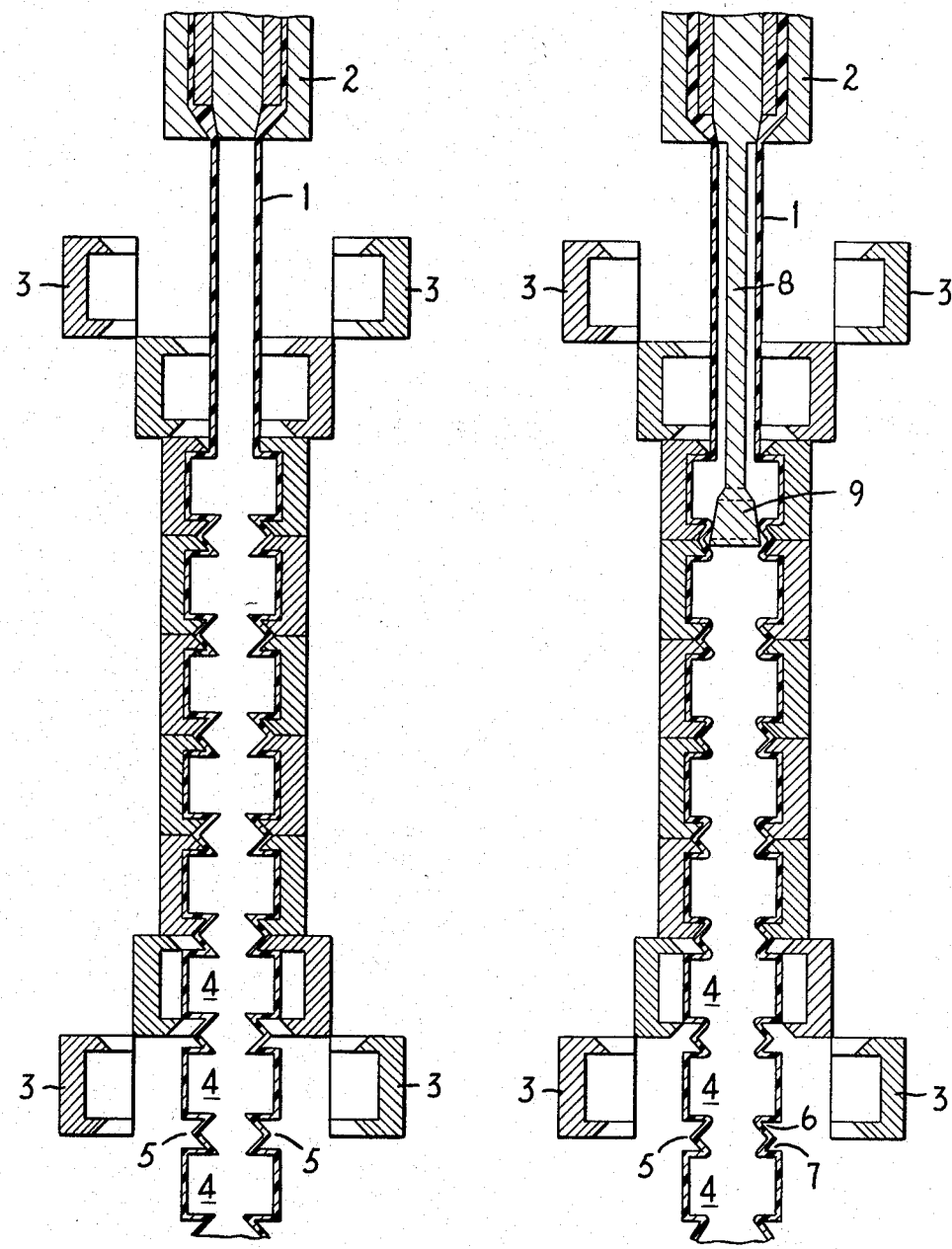

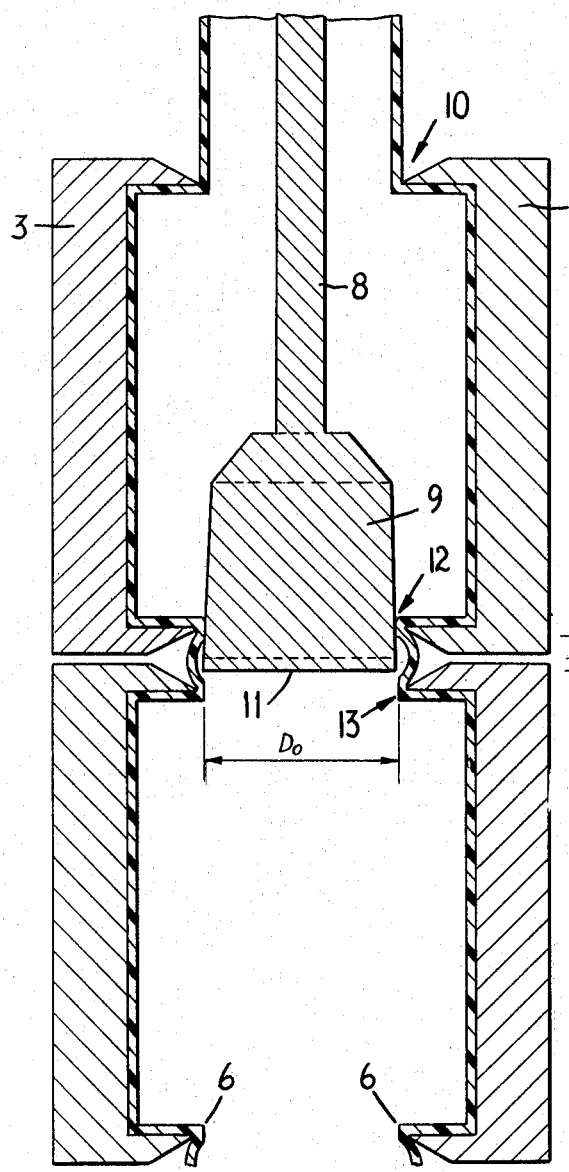
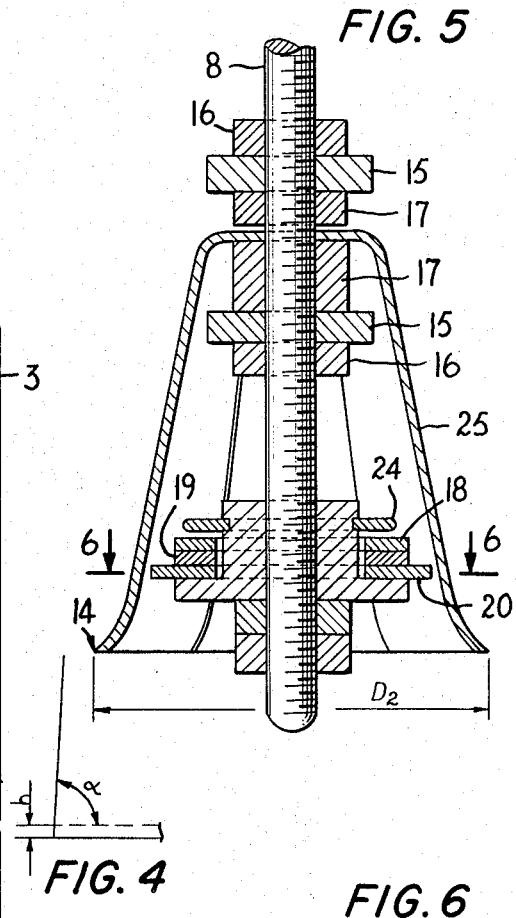
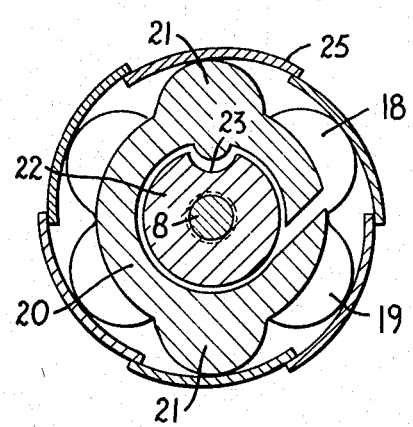
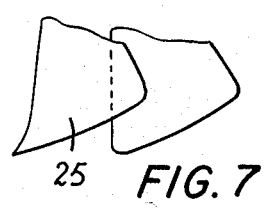

3,310,620
PROCESS FOR THE MANUFACTURE OF HOLLOW ARTICLES
Nério Martelli, Bologna, Italy, and Edouard Colinet, Uccle-Brussels, Belgium, assignors to Solvay & Cie, Brussels, Belgium, a Belgian company
Filed June 9, 1964, Ser. No. 373,624
Claims priority, application Belgium, June 13, 1963, 507,409
8 Claims. (Cl. 264—90)

The present invention relates to a process for the manufacture of hollow articles.

In Dutch patent application No. 290,336 the applicants have described a new type of container of thermoplastic material having a lateral surface provided with two flanges directed towards the axis of the container on which the lids of the container are fitted. The applicants stated that the body of these containers could be obtained by moulding in a continuous manner under vacuum, from tubes of extruded plastic material or by any other known means. In general the tubular parison, heated or coming directly from the extruder, is confined between two half-moulds in which vacuum is applied while they are moved along with the parison. By increasing the number of half-moulds and operating them in a closed cycle it is thus possible to obtain thermally moulded bodies in the form of a continuous chain, the objects being linked together by tubular connections. The obtaining of this continuous chain is a major disadvantage of this process as well as of those which apply the same technique but use internal pressure instead of external reduced pressure for shaping the objects. The various hollow bodies must in fact be separated in the course of an extra operation, for example by sawing, or cutting by means of rotary knives. This operation is troublesome to carry out, particularly when it is a matter of containers having walls which are rather thin, i.e. of the order of 0.1 to 0.5 mm.

The applicants have now found a process which permits the combination in one single operation of the continuous manufacture of hollow bodies and their separation.

In the process forming the object of the present invention the linkage existing between successive moulded hollow articles are weakened or sheared by nipping between the edges of the moulds which are bevelled and an element integral with the extruder which is disposed in the interior of the extruded tube at a place such that the hollow articles are already formed and the plastic material still has a sufficient plasticity to be easily weakened and/or sheared off.

The process according to the invention is described in detail below with reference to the accompanying drawings, in which:

FIGURE 1 is a sectional view of an apparatus for moulding hollow articles under vacuum in which the process forming the object of the invention is not applied;

FIGURE 2 is a sectional view of a similar moulding apparatus in which use is made of the process according to the invention;

FIGURE 3 is a sectional view of an apparatus according to a variant of the process according to the invention;

FIGURE 4 is a detailed view of an apparatus according to the variant shown in FIGURE 3;

FIGURE 5 is a sectional view of an apparatus according to another variant of the invention;

FIGURE 6 is a section on the line A–A' of FIGURE 5;

FIGURE 7 is an elevation of a detail of the variant according to FIGURE 5.

In these drawings two possible embodiments of application of the process according to the invention are presented but it is understood that these are in no way limitative, since the process can be made the object of numerous variations which do not depart from the spirit or scope of the invention.

Likewise in the description which follows only the case is considered where the hollow articles are obtained by the use of vacuum, but it is quite evident that the process according to the invention can, by means of a few minor modifications of the apparatus, be applied to the moulding of hollow articles by blowing.

In FIGURE 1 a sectional view is represented of a moulding apparatus for hollow articles in current use.

The tubular parison 1 coming from the extruder 2, represented schematically, is confined between two series of half-moulds 3 which move forward with the parison. By known means not shown, reduced pressure is brought about between the external wall of the parison and the internal walls of the moulds in such a way that the parison mates with the internal shape of the moulds. After a certain time necessary for solidification of the plastic material, the half-moulds 3 are separated and returned into position for restarting a new moulding cycle. This separation of the half-moulds has the effect of freeing a succession of hollow articles 4 which are tied together by the linkages 5 which have a thickness substantially equal to that of the extruded tube. To obtain each individual hollow body it is thus necessary to carry out two cutting operations.

FIGURES 2 and 4 refer to the process according to the invention and show a possible variant of the apparatus usable for carrying it out.

As shown in FIGURE 1, the tubular parison 1 coming from the extruder 2, is confined between two series of half-moulds 3 in which reduced pressure is applied. The internal device for shearing is constituted by a connecting shaft 8 integral with the torpedo fixed in the extruder 2 and terminated by a mandrel of frusto-conical form 9. During the advance of the half-moulds, the portion of the tubular parison between two successive mould assemblies 3 is sheared between this frusto-conical mandrel and the edge of the semi-moulds 10 which is bevelled. In FIGURE 3 it will be noted that the frusto-conical mandrel 9 has already produced a reduction in thickness of the tubular parison at 13 and that the reduction is in progress at 12. Furthermore it will be noted that the ties between the hollow bodies have been practically sheared at 6. As shown in FIGURES 3 and 4 the frusto-conical mandrel can be terminated by a cylindrical part 11 of which the height $h$ is between 0.1 and 5 mm. The frusto-conical mandrel 9 must be fixed at a place such that the hollow articles are already shaped and so that the material of which they are formed has still a sufficient plasticity to be easily weakened and/or sheared. The maximum diameter of the frusto-conical mandrel must be less by 0 to 0.1 mm. than the diameter of the mould opening. The gap existing between the two parts is conditioned by the plastic material being used. In fact, if this is very fragile in the cold it is not necessary to make an excessive reduction in thickness of the parts to be separated whereas it must be very large or at a maximum (gap reduced to zero) if the material maintains a good elasticity in the cold. The increase of thinning can be regulated by controlling the conicity $\alpha$ of the conical mandrel. In general the applicants have found that according to the material employed, the angle $\alpha$ should be varied between 60 and 89°.

When employing certain plastic materials it can be of interest to provide the conical part of the mandrel with a material having a low coefficient of friction when hot such as polytetrafluoroethylene.

The sharp edges 10 of the moulds 3 are preferably made of hardened steel and can be fiexd to the bodies of the half-moulds which may be made of any material, such as e.g. aluminium, epoxy resins reinforced by glass fibre, etc.

FIGURES 5, 6 and 7 show a second variant of the application of the process according to the invention.

According to this embodiment the general disposition of the apparatus is the same as for the variant previously described and only the nature and the details of the shape of the mandrel for shearing have been modified. The mandrel of this second embodiment, however, also is frusto-conical in its general shape.

In this second variant the surplus wall material of the parison is cut by shearing between the sharp edges 10 of the moving half-moulds 3 and the lower edge 14 of an elastic skirt 25 of hard steel.

The elastic skirt 25 is held in position on a threaded shaft 8 by two sets of nuts 15, counternuts 16 and spacers 17 which likewise prevent its rotation.

The elastic skirt can advantageously be split into several panels 25 which partially overlap and the lower edge of these panels may be cut in the form of a helix (FIGURE 7) to obtain progressive cutting.

The necessary pressure for cutting may be provided by the inherent elasticity of the skirt or may be augmented by a series of embossed split rings.

For example, for a skirt having six panels 25 (FIGURE 6), three split rings are used, 18, 19 and 20, distributed at 120° and each carrying two bosses 21 which come into contact each with one of the panels forming the elastic skirt. These rings are held in place on the support 22 integral with the fixed shaft 8 by means of grooves 23 and a clamping ring 24.

The diameter $D_2$ of the periphery of the base of the panels of the skirt must preferably be greater than the diameter of the opening of the sharp edges 10 of the moulds. This difference in diameter is a function particularly of the material employed, of the material forming the elastic skirt and the means used to augment its rigidity. In general the difference of diameter must be of the order of 2 to 4 mm., but in certain cases it may be necessary to increase it. The diameter of the elastic skirt may moreover be modified by alterning the position of the support 22 along the shaft 8.

We claim:

1. In a process for the continuous manufacture of hollow articles of a plastic material comprising shaping a hollow tube of said plastic material, while in a plastic state, between two groups of complementary half-molds which constitute mold assemblies and are movable with the tube in a longitudinal direction of advance, the molds of each of said groups being serially arranged and each of said molds having a bevelled edge, the improvement comprising fixedly arranging a frustoconical element in the interior of said tube at a portion of said tube at which said tube has been shaped into said hollow articles and is still in a sufficiently plastic state to be readily sheared, said portion being located between two successive ones of said mold assemblies, and shearing said tube between said bevelled edges and said frustoconical element at said portion while advancing said assemblies.

2. Process according to claim 1 characterised in that the frustoconical element is a frustoconical mandrel formed at the end of a shaft.

3. Process according to claim 1 characterised in that the frustoconical element is an elastic skirt forming a frustoconical mandrel at the end of a shaft.

4. Process according to claim 3 characterised in that the maximum diameter of the frusto-conical mandrel is less by 0 to 0.1 mm. than the diameter of the opening of the moulds.

5. Process according to claim 4 characterised in that the maximum diameter of the elastic skirt is greater than that of the opening in the moulds.

6. Process according to claim 4 characterised in that the elastic skirt is formed by several panels of which the lower edges form a helix.

7. Process according to claim 2 characterised in that the plastic material is shaped by an extruder having a torpedo fixed therein and the shaft is integral with the torpedo.

8. Process according to claim 3 characterised in that the plastic material is shaped by an extruder having a torpedo fixed therein and the shaft is integral with the torpedo.

References Cited by the Examiner

UNITED STATES PATENTS

| 2,790,994 | 5/1957 | Cardot et al. | 264—459 XR |
| 3,190,946 | 6/1965 | Keyes | 264—92 |

FOREIGN PATENTS

| 1,266,643 | 6/1961 | France. |
| 37/12,922 | 4/1962 | Japan. |

ROBERT F. WHITE, *Primary Examiner.*

ALEXANDER H. BRODMERKEL, *Examiner.*

A. R. NOE, *Assistant Examiner.*